(12) United States Patent
Kinsel et al.

(10) Patent No.: US 11,310,324 B2
(45) Date of Patent: Apr. 19, 2022

(54) SYSTEM AND METHOD FOR DETERMINING RELEVANCE OF SOCIAL CONTENT

(71) Applicant: Twitter, Inc., San Francisco, CA (US)

(72) Inventors: Patrick A. Kinsel, Boston, MA (US); Alexander P. Lambert, Cambridge, MA (US); Simon S. Yun, Dorchester Center, MA (US); Alexander James Jenkins, Brookline, MA (US); Jeffrey Lupien, Lynnfield, MA (US); Keh-Li Sheng, Boston, MA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 13/758,372

(22) Filed: Feb. 4, 2013

(65) Prior Publication Data
US 2013/0204940 A1    Aug. 8, 2013

Related U.S. Application Data

(60) Provisional application No. 61/594,701, filed on Feb. 3, 2012, provisional application No. 61/594,688, filed on Feb. 3, 2012.

(51) Int. Cl.
  *H04L 29/08*  (2006.01)
  *H04L 29/06*  (2006.01)
  *H04L 67/50*  (2022.01)
  *H04L 67/306* (2022.01)
  (Continued)

(52) U.S. Cl.
  CPC ............ *H04L 67/22* (2013.01); *G06Q 30/02* (2013.01); *G06Q 50/01* (2013.01); *H04L 67/306* (2013.01)

(58) Field of Classification Search
  CPC .... G06Q 10/10; G06Q 50/01; G06Q 30/0255; G06Q 30/0272; G06Q 30/0224; G06Q 30/02; H04L 29/06; H04L 29/08072; H04L 29/06027; H04L 12/581; H04L 67/22;
  (Continued)

(56) References Cited

U.S. PATENT DOCUMENTS 9,349,128 B1 *   5/2016   Kerr ................... G06Q 30/0261
2006/0074883 A1  4/2006   Teevan et al.
(Continued)

OTHER PUBLICATIONS

International Search Report and Written Opinion for PCT/US2013/024606 dated Apr. 19, 2013.

*Primary Examiner* — Hitesh Patel
*Assistant Examiner* — Clifton Houston
(74) *Attorney, Agent, or Firm* — Cesari and McKenna, LLP

(57) ABSTRACT

A method, computer program product, and computer system for receiving, at a computing device, information associated with an entity from one or more social media sites. One or more attributes for the information associated with the entity is identified. A relevance profile associated with the one or more attributes is generated. A plurality of posts from the one or more social media sites is identified, wherein at least a portion of the plurality of posts includes at least a portion of the one or more attributes for the information associated with the entity. At least the portion of the plurality of posts is ordered on a display based upon, at least in part, the relevance profile associated with the one or more attributes.

15 Claims, 14 Drawing Sheets

(51) Int. Cl.
*G06Q 30/02* (2012.01)
*G06Q 50/00* (2012.01)

(58) Field of Classification Search
CPC ....... H04L 67/306; H04L 51/32; H04L 51/20; G06F 17/3087; H04W 4/02
USPC ........................................................ 709/204
See application file for complete search history.

(56) References Cited

U.S. PATENT DOCUMENTS

| | | | |
|---|---|---|---|
| 2006/0112392 A1* | 5/2006 | Zhang | H04L 51/26 718/102 |
| 2006/0161531 A1* | 7/2006 | Khandelwal | G06F 16/90335 |
| 2007/0088801 A1* | 4/2007 | Levkovitz | H04L 12/1859 709/217 |
| 2008/0215475 A1* | 9/2008 | Ramer | G06F 17/30867 705/37 |
| 2008/0249798 A1* | 10/2008 | Tulshibagwale | G06Q 30/02 705/1.1 |
| 2008/0294628 A1* | 11/2008 | Shoval | G06F 16/337 |
| 2009/0070435 A1 | 3/2009 | Abhyanker | |
| 2009/0106040 A1* | 4/2009 | Jones | 705/1 |
| 2009/0138457 A1* | 5/2009 | Askey | G06F 16/4387 |
| 2009/0209270 A1* | 8/2009 | Gutierrez | G06F 16/9537 455/456.3 |
| 2010/0306190 A1* | 12/2010 | Turner | G06F 16/9535 707/723 |
| 2010/0325131 A1* | 12/2010 | Dumais | G06F 16/9535 707/759 |
| 2011/0004831 A1* | 1/2011 | Steinberg | H04N 21/454 715/753 |
| 2011/0066615 A1 | 3/2011 | Pradhan et al. | |
| 2011/0072052 A1* | 3/2011 | Skarin et al. | 707/794 |
| 2011/0196860 A1 | 8/2011 | Kawale et al. | |
| 2011/0296463 A1* | 12/2011 | Suslov | H04N 21/4755 725/44 |
| 2012/0042020 A1* | 2/2012 | Kolari | G06Q 10/107 709/206 |
| 2012/0166452 A1* | 6/2012 | Tseng | H04L 65/403 707/749 |
| 2012/0166530 A1* | 6/2012 | Tseng | H04L 51/20 709/204 |
| 2012/0215684 A1* | 8/2012 | Kidron | G06F 15/167 705/39 |
| 2012/0221563 A1* | 8/2012 | De | G06Q 10/06 707/728 |
| 2012/0278168 A1* | 11/2012 | O'Hara | G06Q 30/0271 705/14.53 |
| 2013/0073686 A1* | 3/2013 | Sandholm | G06Q 30/0631 709/219 |
| 2013/0104026 A1* | 4/2013 | Reynar | G06F 16/29 715/234 |
| 2013/0159506 A1* | 6/2013 | Stern et al. | 709/224 |
| 2013/0179502 A1* | 7/2013 | Faller et al. | 709/204 |

\* cited by examiner

FIG. 5a

| Features | | |
|---|---|---|
| MUST | be from source | Facebook |
| MUST | be from source | Twitter |
| MUST NOT | include | URL |
| MUST | include | Photo |
| MUST | include | Video |
| MUST NOT | include | Hashtag |
| MUST | include | @ replies |
| MUST | be | Native retweet |
| MUST | be | Edited retweet |
| MUST NOT | be | Retweet (any kind) |
| MUST | be authored by | Local account |
| MUST | be authored by | Regional account |
| MUST | be authored by | National account |
| MUST | be authored by | Global account |
| MUST | be dated | Today |
| MUST | be of age | < 1 hour |

Spindle Labs Editorial | Data Quality | Rank | Simulator

- Basic Content Rank | Category Content Rank | Category Stack Rank | Notification Rules New Basic Content Rule [Save] Cancel

Terms & Phrases

[MUST ▾] include (*) all of these words [Keyword or phrase...] in [any content ▾]
( ) any of these words
(+) Add row ( ) the exact phrase

Features                                    Time in Effect

☐ [MUST ▾] be from source   Facebook            ○ Always  ⦿ Repeats  ○ One time
☐ [MUST ▾] be from source   Twitter
☐ [MUST ▾] include          URL                 Repeats:   [Daily ▾]
☐ [MUST ▾] include          Photo               Time:      ⦿ All day ○ From
☐ [MUST ▾] include          Video                          [eg 2:00 pm] until [eg 10:45 pm]
☐ [MUST ▾] include          Hashtag             Time zone: ⦿ Local
☐ [MUST ▾] include          @ replies           Start date: 1/24/2013
☐ [MUST ▾] be               Native retweet      End date:  ⦿ Never ○ On 1/24/2014
☐ [MUST ▾] be               Edited retweet
☐ [MUST ▾] be               Retweet (any kind)
☐ [MUST ▾] be authored by   Local account
☐ [MUST ▾] be authored by   Regional account
☐ [MUST ▾] be authored by   National account
☐ [MUST ▾] be authored by   Global account
☐ [MUST ▾] be dated         [Today ▾]
☐ [MUST ▾] be of age        [< 1 hour ▾]

Spindle Labs Editorial | Data Quality | Rank | Simulator

Basic Content Rank | Category Content Rank | Category Stack Rank | Notification Rules Brunch finder relevance profile

Save Changes Cancel

+ New Rule

| Rule Name | Time in Effect | Action | Edit |
|---|---|---|---|
| Food & Beverage > Coffee & Tea | Daily | [ weight: 1.2 additive ] | ✎ |
| Food & Beverage > Bakeries | Daily | [ weight: 1.26266 multiplicative ] | ✎ |
| Shopping | Daily | [ forbidden ] | ✎ |
| Arts & Entertainment | Daily | [ require ] | ✎ |
| Restaurants | Daily | [ weight: 0.02 exponential ] | ✎ |
| Nightlife | Daily | [ forbidden ] | ✎ |
| Bars | All days except Sunday | | ✎ |

FIG. 11

SYSTEM AND METHOD FOR DETERMINING RELEVANCE OF SOCIAL CONTENT

RELATED CASES

This application claims the benefit of U.S. Provisional Application No. 61/594,688, filed on 3 Feb. 2012, by Kinsel et al., entitled Structured Social Search System, and U.S. Provisional Application No. 61/594,701, filed on 3 Feb. 2012, by Kinsel et al., entitled Generic and Personalized Nearby Feed of Ranked Social Content, the contents of which are all incorporated by reference.

BACKGROUND

Large amounts of entities (e.g., people, businesses, bands, etc.) may have a presence in multiple locations, e.g., on websites. For example, a business may have a personal website, as well as one or more other social media websites (e.g., Facebook, Twitter, etc.). There may be a substantial amount of "posts" created by the business (e.g., about promotions or product updates), as well as a substantial amount of posts created by others (e.g., patrons of the business) about the business or products. With so many posts created by so many different entities about various topics, typical keyword searches, e.g., provided by the social media websites, may be inadequate for users to obtain the most relevant posts about their search.

BRIEF SUMMARY OF DISCLOSURE

In one implementation, a method, performed by one or more computing devices, comprises receiving, at a computing device, information associated with an entity from one or more social media sites. One or more attributes for the information associated with the entity is identified. A relevance profile associated with the one or more attributes is generated. A plurality of posts from the one or more social media sites is identified, wherein at least a portion of the plurality of posts includes at least a portion of the one or more attributes for the information associated with the entity. At least the portion of the plurality of posts is ordered on a display based upon, at least in part, the relevance profile associated with the one or more attributes.

One or more of the following features may be included. The relevance profile may include at least one of a positive weight, a negative weight, require, and forbid associated with at least one of the one or more attributes. The one or more attributes may include at least one of an entity category, an entity location, and an entity account geographic scope. The relevance profile may include a place category-based rank. The relevance profile may include a time in effect. The relevance profile may include a content rule. The relevance profile may include a time of day reference.

In another implementation, a computing system includes a processor and a memory configured to perform operations comprising receiving information associated with an entity from one or more social media sites. One or more attributes for the information associated with the entity is identified. A relevance profile associated with the one or more attributes is generated. A plurality of posts from the one or more social media sites is identified, wherein at least a portion of the plurality of posts includes at least a portion of the one or more attributes for the information associated with the entity. At least the portion of the plurality of posts is ordered on a display based upon, at least in part, the relevance profile associated with the one or more attributes.

One or more of the following features may be included. The relevance profile may include at least one of a positive weight, a negative weight, require, and forbid associated with at least one of the one or more attributes. The one or more attributes may include at least one of an entity category, an entity location, and an entity account geographic scope. The relevance profile may include a place category-based rank. The relevance profile may include a time in effect. The relevance profile may include a content rule. The relevance profile may include a time of day reference.

In another implementation, a computer program product resides on a computer readable storage medium that has a plurality of instructions stored on it. When executed by a processor, the instructions cause the processor to perform operations comprising receiving information associated with an entity from one or more social media sites. One or more attributes for the information associated with the entity is identified. A relevance profile associated with the one or more attributes is generated. A plurality of posts from the one or more social media sites is identified, wherein at least a portion of the plurality of posts includes at least a portion of the one or more attributes for the information associated with the entity. At least the portion of the plurality of posts is ordered on a display based upon, at least in part, the relevance profile associated with the one or more attributes.

One or more of the following features may be included. The relevance profile may include at least one of a positive weight, a negative weight, require, and forbid associated with at least one of the one or more attributes. The one or more attributes may include at least one of an entity category, an entity location, and an entity account geographic scope. The relevance profile may include a place category-based rank. The relevance profile may include a time in effect. The relevance profile may include a content rule. The relevance profile may include a time of day reference.

The details of one or more implementations are set forth in the accompanying drawings and the description below. Other features and advantages will become apparent from the description, the drawings, and the claims.

BRIEF DESCRIPTION OF THE DRAWINGS

FIG. 5a is an illustrative diagrammatic view of a screen image displayed by the query process of FIG. 1 according to one or more implementations of the present disclosure;

FIG. 6 is an illustrative diagrammatic view of a screen image displayed by the query process of FIG. 1 according to one or more implementations of the present disclosure;

FIG. 7 is an illustrative diagrammatic view of a screen image displayed by the query process of FIG. 1 according to one or more implementations of the present disclosure;

FIG. 8 is an illustrative diagrammatic view of a screen image displayed by the query process of FIG. 1 according to one or more implementations of the present disclosure;

Figure 9:
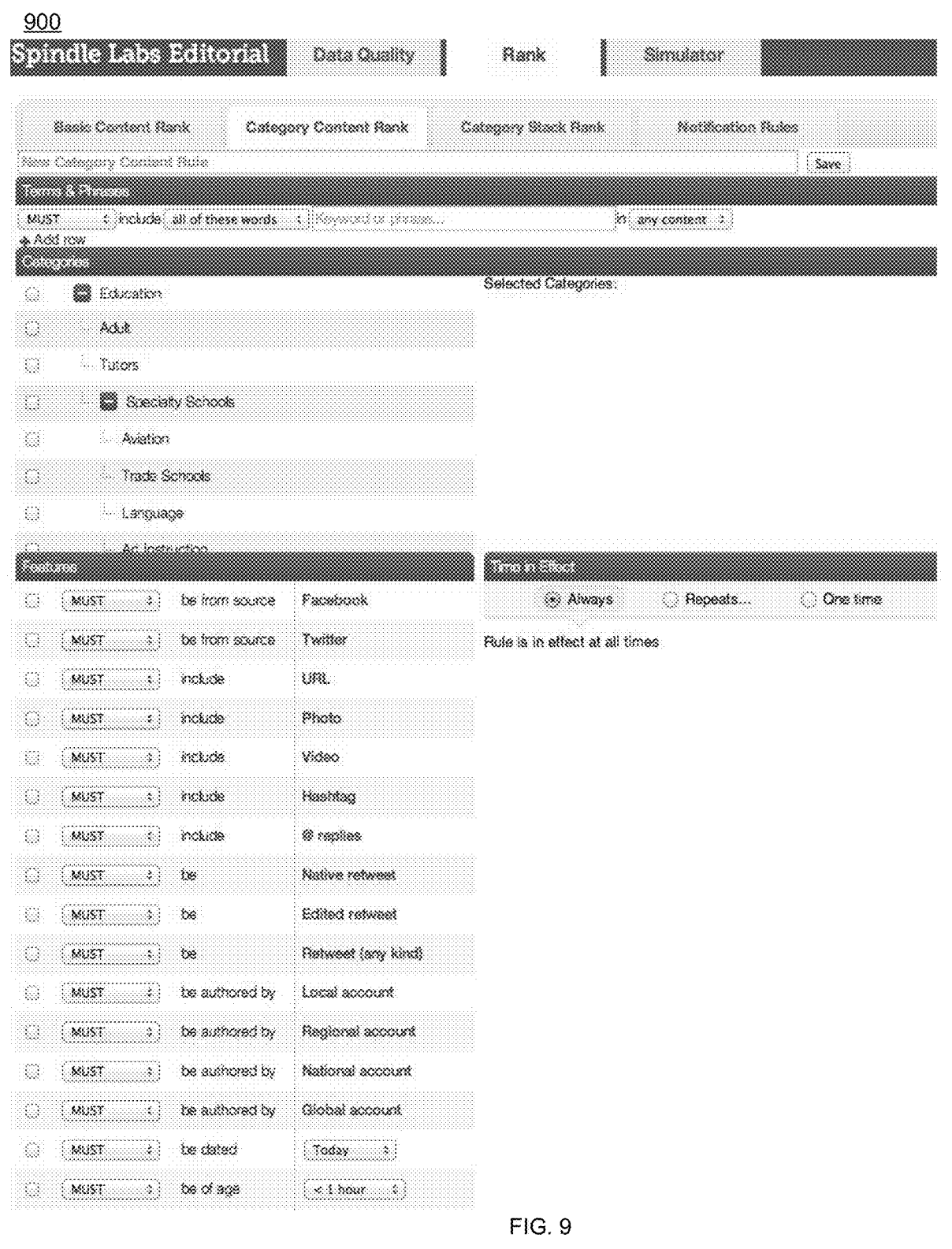

FIG. 9 is an illustrative diagrammatic view of a screen image displayed by the query process of FIG. 1 according to one or more implementations of the present disclosure;

Figure 10:
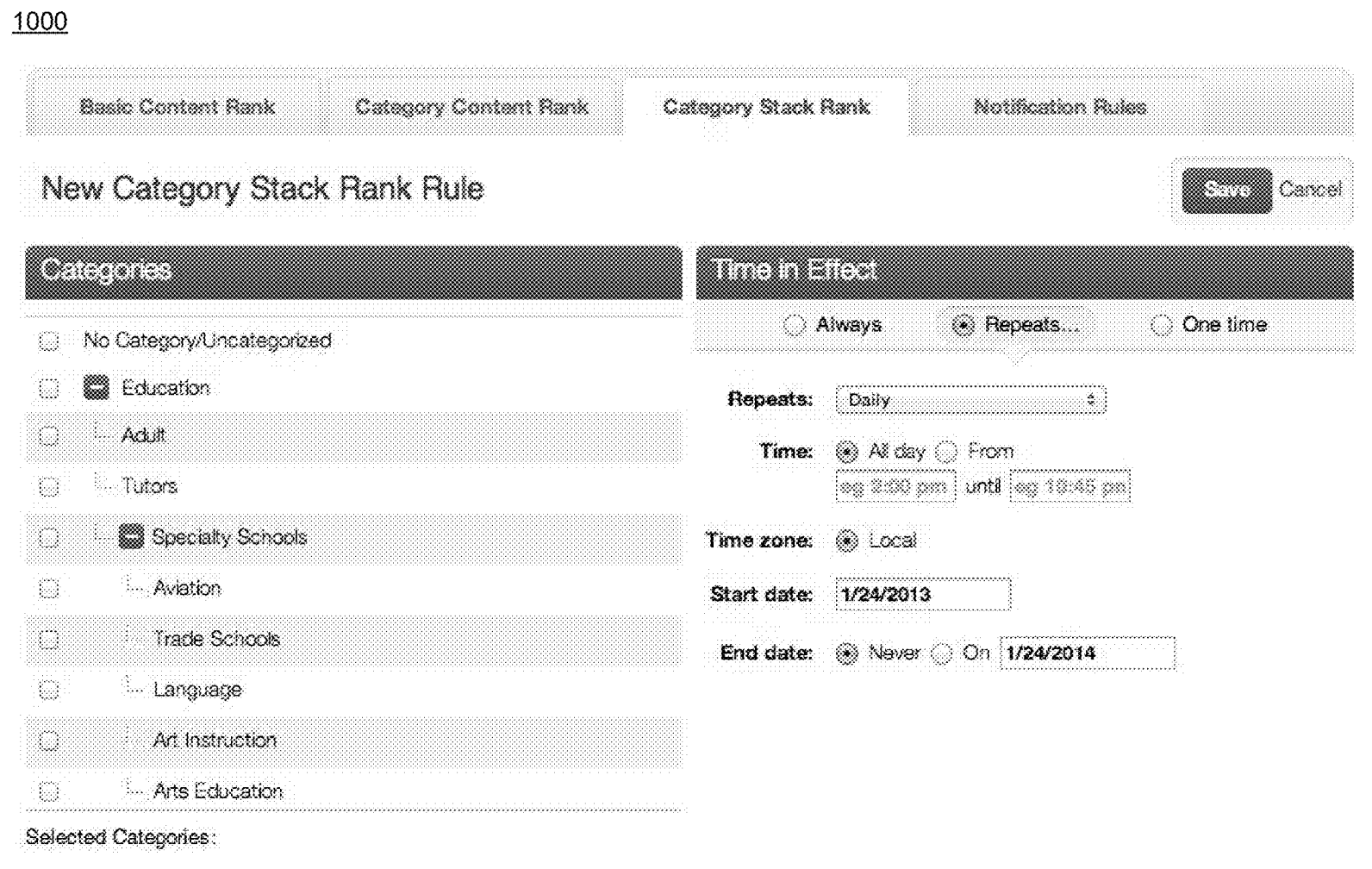

FIG. 10 is an illustrative diagrammatic view of a screen image displayed by the query process of FIG. 1 according to one or more implementations of the present disclosure;

FIG. 11 is an illustrative diagrammatic view of a screen image displayed by the query process of FIG. 1 according to one or more implementations of the present disclosure;

Like reference symbols in the various drawings indicate like elements.

DETAILED DESCRIPTION

Figure 1:
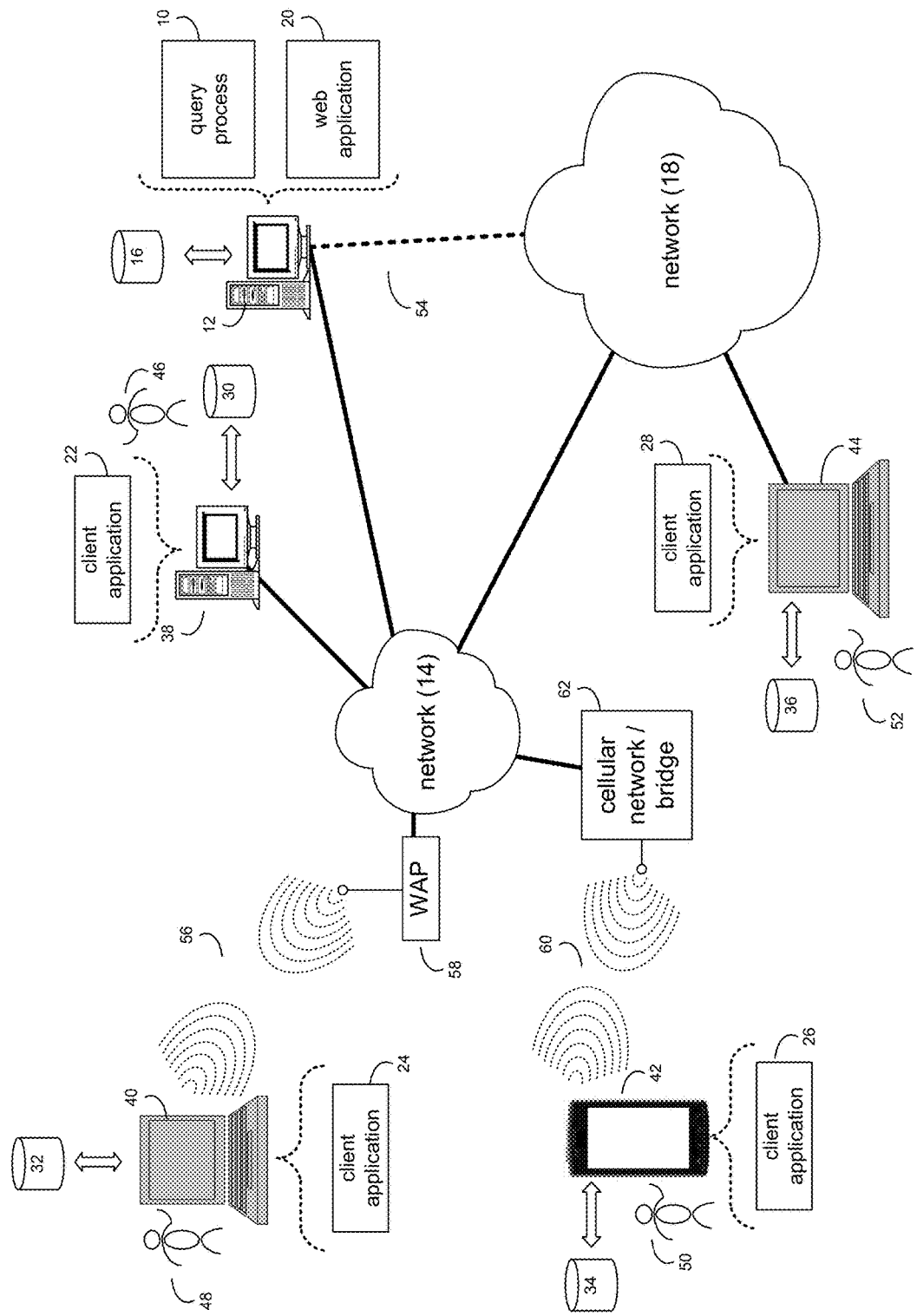
FIG. 1 is an illustrative diagrammatic view of a query process coupled to a distributed computing network according to one or more implementations of the present disclosure.

As will be discussed in greater detail below, query process 10 may, for example, define any property (e.g., attribute), attach that property to content in an index, define relevance strategies and weights for those properties, apply those weights via a search index, and assign different relevance strategies or profiles to different views within one or more applications (e.g., via query process 10). As will also be discussed in greater detail below, the ability to identify and/or rank content from websites (e.g., social media network sites) may require, in some instances, a search system that may leverage structured social data. For example, query process 10 (shown at least in FIG. 1) may include a structured social search system that may include a combination of one or more components, which may include but is not limited to, e.g., the ability to editorially define a structured ontology, the ability to algorithmically and/or editorially assign entities and content to the appropriate classification within that structured ontology, the ability to fetch the appropriate data and content from social media (network) sites about the entities given their classification within the ontology, the ability to define rank and relevance scoring strategies around attributes of the structured ontology, the ability to use these editorially defined ranking strategies against a search index and the ability to bind different ranking strategies to different queries and different views within any N applications.

Query process 10 may, for example, establish such a structured ontology using, e.g., algorithmic and/or editorial techniques. For instance, algorithmically, query process 10 may classify places with, e.g., their business category. For example, a sushi restaurant may be algorithmically labeled via query process 10 with a category of "sushi". Query process 10 may algorithmically label the restaurant via several example techniques, some examples of which may include but are not limited to manually (and/or automatically) mapping categories from other services (e.g., social media (network) site services) to a category ontology specific to query process 10, scraping web content for references to terms associated with a category ontology specific to query process 10, or manually (and/or automatically) editing the business classification of a given place. Query process 10 may (e.g., via a user interface associated with query process 10), enable an editor (e.g., user) to structure such things as, e.g., topics, keywords or tags and their relationship to other associated people, places and entities. For instance, an editor may, via query process 10 for example, establish "sushi" as a topic (or any other editor-defined type such as "class", "category", "term", etc.). The editor may, via query process 10 for example, establish similar terms for that topic (like "Hamachi" and other synonyms). Query process 10 may link that topic with certain places (e.g., such as restaurant: sushi). This relationship may be a parent to child, sibling(s), or may be a related type. Query process 10 may label people who establish a presence at these places (e.g., via "checking in" or other known techniques) and the content they create as "visitor content". Content that references these places (e.g., by explicit mentions of place name or social network identifier) may be labeled by query process 10 as "place reference". It will be appreciated that these are non-limiting examples, and that an editor (e.g., via query process 10) may define any particular structure using a set of editorial tools (described in greater detail below).

Query process 10 may, in some implementations, determine the appropriate technique to fetch and index, e.g., social data, given its structure. For example, for query process 10 to present the correct content to a user, the correct content may be indexed and available to be ranked and returned. As an editor (e.g., via query process 10) creates the topic "Sushi" and establishes "Hamachi" as related term, query process 10 may fetch content about "Hamachi" from one or more (e.g., all available) social media networking services/sites. As another example, if query process 10 became aware of a new sushi restaurant, query process 10 may find that restaurant across one or more of the social media networking sites (and/or other websites) and may fetch at least a portion or all content authored by those accounts (e.g., the social media networking site accounts), and/or content authored by others that may mention those accounts within each social media networking site. For instance, considering a Boston Celtics example, if query process 10 became aware of the team, an editor (e.g., via query process 10) may establish the structure of the organization (team, players, events, etc.) or this structure may be inherited by the team's classification as, e.g., NBA, Basketball, or other classification. Query process 10 may begin fetching content accordingly as noted above. For example, query process 10 may algorithmically identify the primary accounts for the Boston Celtics across one or more social media networking services/sites and ingest content authored by those accounts, and/or content authored by others that may mention those accounts. In the example, as players are identified, query process 10 may algorithmically find those players' official accounts across social media networking services/sites and ingest content authored by those accounts and/or content authored by others that may mention those accounts. The content may be indexed and labeled by query process 10 with the appropriate metadata within the above-noted structured ontology (e.g., content from Paul Pierce may be annotated with metadata indicating that it is authored by a "Player" of the organization The Boston Celtics). It will be appreciated that the examples described are for example purposes only and not to limit the scope of the disclosure, as query process 10 may ingest and structure any content that an editor indicates (e.g., via query process 10).

As will also be discussed further below, query process 10 may fetch the appropriate content for ranking and presentation to the user, as well as enable a unique ability to rank the content in an index. For example, an editor may (e.g., via query process 10) define unique ranking strategies (referred to interchangeably as ranking profiles or relevance profiles). For example, an editor may indicate that "Sushi" is a topic with the related term "Hamachi" and it is a parent of places of the type "Sushi Restaurant." People that visit those restaurants and the content they create while in attendance may be labeled by query process 10 with the "place visitor" attribute in the above-noted structured ontology. An editor (e.g., via query process 10) may be able to write a custom ranking profile on top of this structure. For instance, assume for example purposes only that an editor wants to quickly author a set of rules that surface the most interesting (e.g., relevant) content about sushi. The first objective may be to surface content about the keyword "sushi" and its related terms like "Hamachi". As will be discussed in greater detail below, the editor (e.g., via query process 10) may apply a weight to these terms. The second objective may be to surface relevant content from sushi restaurants. For example, the editor (e.g., via query process 10) may apply a positive or negative weight to content authored by places of the type "Sushi Restaurant." The editor (e.g., via query process 10) may apply a negative weight to what may be considered to be boring (e.g., less relevant) terms related to the topic of sushi when authored by sushi restaurants (e.g., terms like "hiring" or "will be on TV"). The editor (e.g., via query process 10) may apply a positive weight to what they consider interesting terms (e.g., directly related to the topic of sushi) when authored by sushi restaurants (e.g., terms like "fresh" or "on sale" or "today only"). With these example and non-limiting example rules, the editor (e.g., via query process 10) may create a custom ranking profile that may return content from sushi restaurants, and suppress what they perceive to be boring terms and promote what they perceive to be interesting terms. Further in the example, assume that the editor (e.g., via query process 10) wants to include content written by people discussing these sushi restaurants. The editor (e.g., via query process 10) may author a rule that may require content be of the type "place reference" for place category "Sushi Restaurant." The editor (e.g., via query process 10) may author rules that promote or suppress certain attributes within this content. For example, the editor (e.g., via query process 10) may apply a positive weight to content containing photos or phrases like "long line" and "food poisoning", and/or may apply a negative weight to phrases like "just sat down." In the example, query process 10 may combine this set of rules with the previous sets to create a ranking profile that may positively weight interesting content from sushi restaurants as well as interesting content about sushi restaurants. As another example, if the editor (e.g., via query process 10) wants to add content from people who are physically present at restaurants, the editor (e.g., via query process 10) may write a set of rules around the label "place visitor." In some implementations, content from place visitors may be more highly ranked than content from people simply referencing the place by name. Thus, the editor (e.g., via query process 10) may apply a positive weight to place visitor content over place reference content.

In some implementations, query process 10 may enable the editor to create a set of ranking profiles for, e.g., The Boston Celtics. For example, the editor (e.g., via query process 10) may define any class or label within the structured ontology. For instance, just as in the sushi example where someone who visits a restaurant and the content they create while in attendance may be labeled with "place visitor", a person present at the location of a Celtics' game during the duration of the game may be labeled as an "event visitor." The editor (e.g., via query process 10) may create more than one ranking profile. For instance, the first objective may be to surface content from the team and its players, and query process 10 may apply a positive weight to content from the organization's official account. Similarly, query process 10 may do the same for content authored by the official accounts of people of type "organization member." The editor (e.g., via query process 10) may define a set of ranking rules to positively weight certain phrases and attributes within this content. For example, the editor (e.g., via query process 10) may indicate terms like "injury," "win," and "trade" should receive a positive weight, and/or content that contains photos may receive a positive weight. As noted above, the editor (e.g., via query process 10) may similarly apply a negative weight to terms they find uninteresting. In the example, at least by creating the set of rules, the editor (e.g., via query process 10) may create a ranking profile that identifies interesting content from the team and its players. Further in the example, if the editor (e.g., via query process 10) wants to add content about the team and its players, the editor (e.g., via query process 10) may positively weight content labeled with "organization reference" and "organization member reference" or other label created in the structured ontology. As another example, if the editor (e.g., via query process 10) wants to promote content from events, the editor (e.g., via query process 10) may apply a positive weight from content with label "event visitor." As another example, if the editor (e.g., via query process 10) wants to create a result view that only displays photos, the editor (e.g., via query process 10) may create a profile that requires content to include photos. The editor (e.g., via query process 10) may set a positive weight for content that references the team and its players and another positive weight for content taken by people who are event visitors. This may produce, for example, a view of photos of players at the game.

While specific examples of queries and examples of their ranking profiles may be described, it will be appreciated that query process 10 may enable an editor to create any set of structured attributes and corresponding weights. That is, query process 10 may include the capabilities to combine the ability to define a structured ontology, to label social media networking site entities and social media networking site content within that structured ontology, to fetch the appropriate content and label it with the structured metadata, to define unique weights around the structured metadata, to specify required and forbidden attributes, and to use these editorially defined ranking strategies against a search index. As such, the examples described throughout should not be taken to limit the scope of the disclosure.

In some implementations, the editor (e.g., via query process 10) may bind the unique ranking profiles to different views within one or more applications or to different applications entirely. For instance, assume for example purposes only that an application presents a list of events and allows a user to click through to a full detailed view of each event. The application may include one or more ranking profiles, e.g., one ranking profile that may rank events based on a set of defined rules, and another that may rank the content from each event, etc. In some implementations, the rank of event content may be event category specific. For example, all events of the type Basketball may positively weight content with references to "dunk" while all events of the type Music may positively weight content with references to "on stage." These example rules may be assigned by query process 10 within the structured ontology, and the editor (e.g., via query process 10) may define a set of ranking rules for events by event type. In some implementations, the editor may want to release an entirely new application on top of the above-noted structured social search system. For example, the editor may want to release an application to help people find jobs in their local community. In the example, the editor (e.g., via query process 10) may define a ranking profile that applies a positive weight to phrases and/or words like "hiring" from places of the type "Company." In the example, the ranking profile may be used as, e.g., its own application, as a feature or foundation of one or more applications, as an application programming interface for other services to consume, or may be used differently. It will be appreciated that while examples of defining attributes and ranking strategies are described throughout, query process 10 may define any attribute within the ontology and may define any ranking strategies accordingly. As such, the examples described throughout should not be taken to limit the scope of the disclosure.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown query process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, query process 10 may receive, at a computing device, information associated with an entity from one or more social media sites. One or more attributes for the information associated with the entity may be identified. A relevance profile associated with the one or more attributes may be generated. A plurality of posts from the one or more social media sites may be identified, wherein at least a portion of the plurality of posts may include at least a portion of the one or more attributes for the information associated with the entity. At least the portion of the plurality of posts may be ordered on a display based upon, at least in part, the relevance profile associated with the one or more attributes.

The instruction sets and subroutines of query process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Query process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a web application (e.g., web application 20), examples of which may include, but are not limited to, e.g., a web content management system application, a social media website application, a web content searching and/or ranking application, a web content indexing application, or other application that allows for running, managing, and/or searching of content (e.g., web content). Query process 10 and/or web application 20 may be accessed via client applications 22, 24, 26, 28. Query process 10 may be a stand alone application, or may be an applet/application/script that may interact with and/or be executed within web application 20 and/or one or more of client applications 22, 24, 26, 28. Web application 20 may be a stand alone application, or may be an applet/application/script that may interact with and/or be executed within query process 10 and/or one or more of client applications 22, 24, 26, 28. One or more of client applications 22, 24, 26, 28 may be a stand alone application, or may be an applet/application/script that may interact with and/or be executed within query process 10 and/or web application 20. Examples of client applications 22, 24, 26, 28 may include, but are not limited to, e.g., a web content management system application, a social media website application, a web content searching and/or ranking application, a web content indexing application, or other application that allows for running, managing, and/or searching of content (e.g., web content), a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of query process 10 (and vice versa). Accordingly, query process 10 may be a purely server-side application, a purely client-side application, or a hybrid server-side/client-side application that is cooperatively executed by one or more of client applications 22, 24, 26, 28 and/or query process 10.

One or more of client applications 22, 24, 26, 28 may be configured to effectuate some or all of the functionality of web application 20 (and vice versa). Accordingly, web application 20 may be a purely server-side application, a purely client-side application, or a hybrid server-side/client-side application that is cooperatively executed by one or more of client applications 22, 24, 26, 28 and/or web application 20. As one or more of client applications 22, 24, 26, 28, query process 10, and web application 20, taken singly or in any combination, may effectuate some or all of the same functionality, any description of effectuating such functionality via one or more of client applications 22, 24, 26, 28, query process 10, web application 20, or combination thereof, and any described interaction(s) between one or more of client applications 22, 24, 26, 28, query process 10, web application 20, or combination thereof to effectuate such functionality, should be taken as an example only and not to limit the scope of the disclosure.

Users 46, 48, 50, 52 may access computer 12 and query process 10 directly through network 14 or through secondary network 18. Further, computer 12 may be connected to network 14 through secondary network 18, as illustrated with phantom link line 54. Query process 10 may include one or more user interfaces, such as browsers and textual or graphical user interfaces, through which users 46, 48, 50, 52 may access query process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
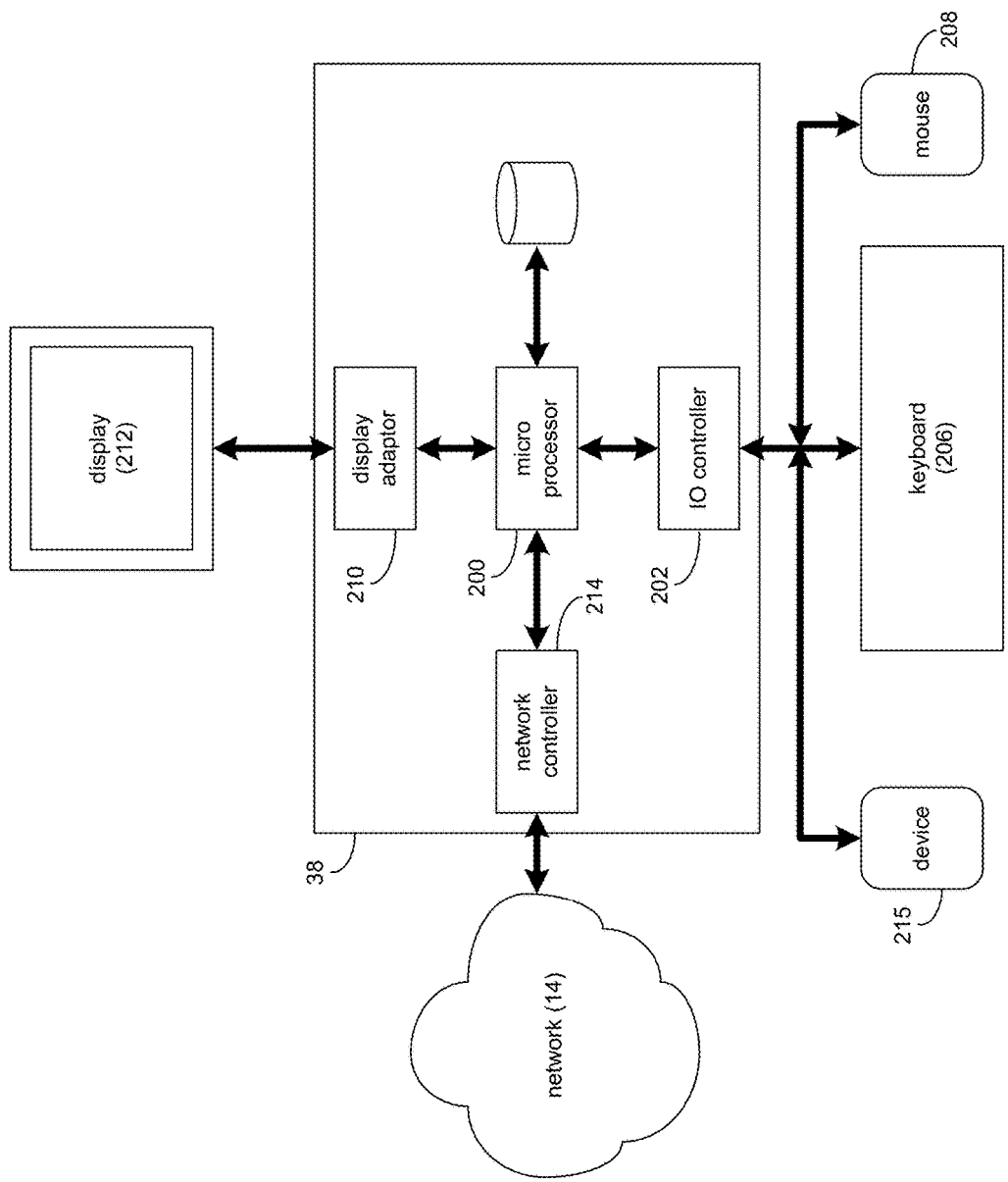
FIG. 2 is a diagrammatic view of a client electronic device of FIG. 1 according to one or more implementations of the present disclosure.
Figure 3:
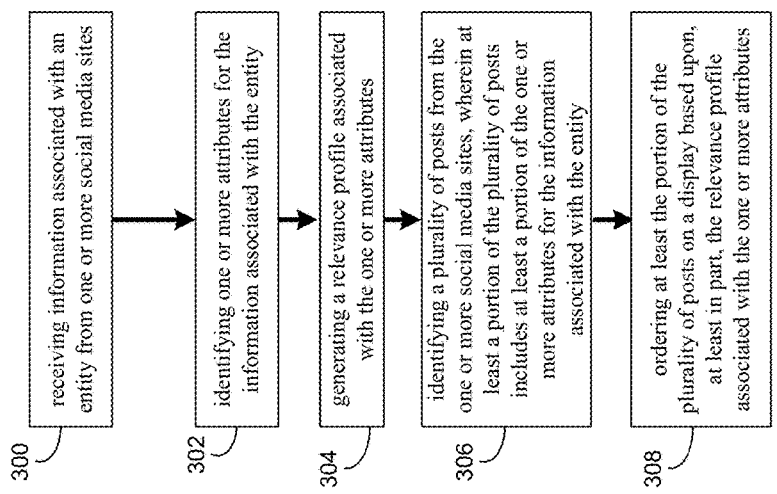
FIG. 3 is an illustrative flowchart of the query process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, query process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also to FIGS. 3-12b, query process 10 may receive 300, at a computing device, information associated with an entity from one or more social media sites. One or more attributes for the information associated with the entity may be identified 302 by query process 10. A relevance profile associated with the one or more attributes may be generated 304 by query process 10. A plurality of posts from the one or more social media sites may be identified 306 by query process 10, wherein at least a portion of the plurality of posts may include at least a portion of the one or more attributes for the information associated with the entity. At least the portion of the plurality of posts may be ordered 308 on a display by query process 10 based upon, at least in part, the relevance profile associated with the one or more attributes.

Figure 4:
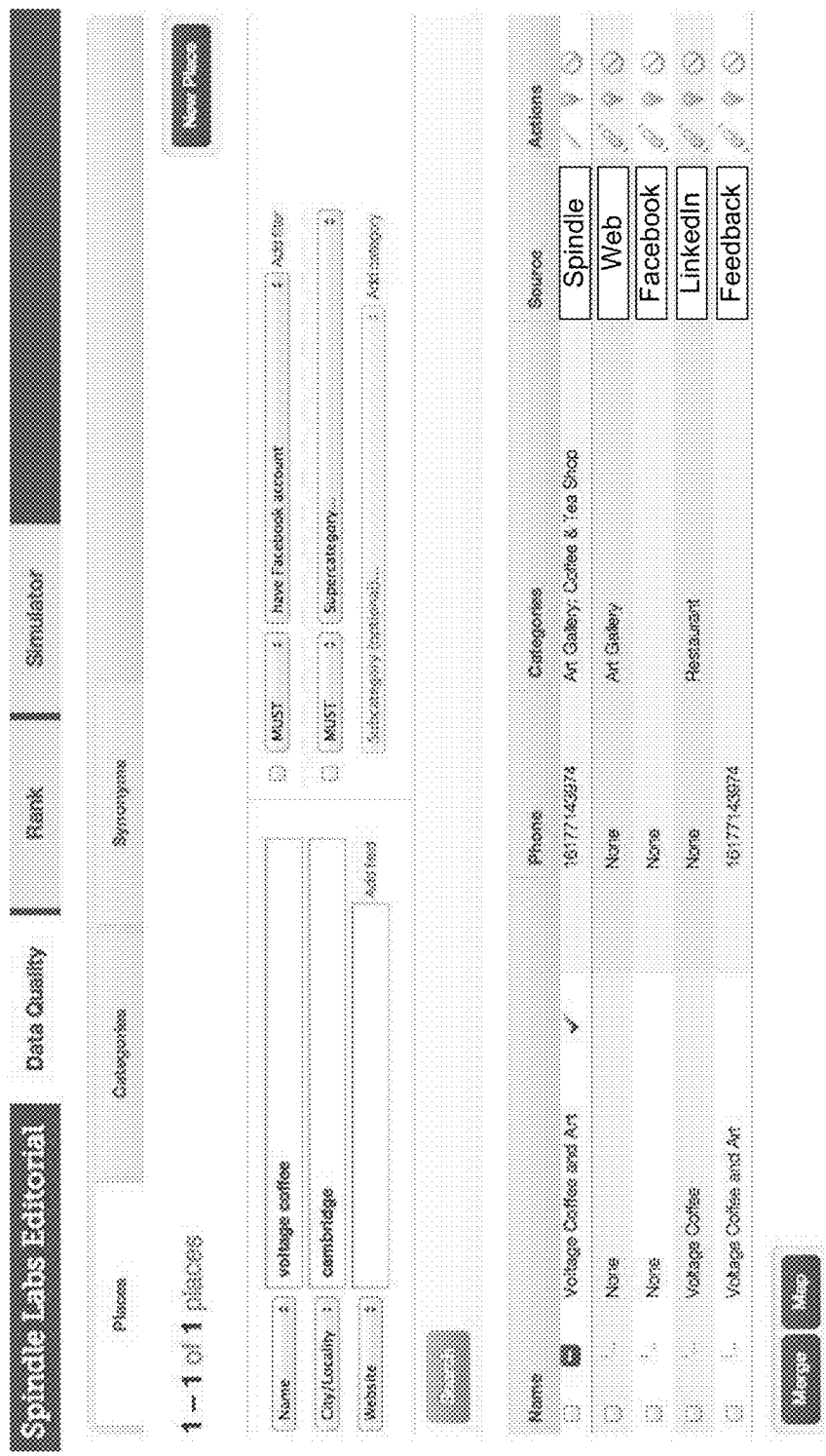
FIG. 4 is an illustrative diagrammatic view of a screen image displayed by the query process of FIG. 1 according to one or more implementations of the present disclosure.

In some implementations, query process 10 may receive 300, at a computing device, information associated with an entity from one or more social media sites. For example, referring at least to FIG. 4, query process 10 may gather accurate data (e.g., place data). In some implementations, place data may be entered by an editor (e.g., user 46) via a user interface (e.g., user interface 400) associated with query process 10. In some implementations, place data may be entered automatically by query process 10. Query process 10 may use place data and find one or more of the above-noted social media site account(s) associated with a place to feature posts (e.g., from a feed, a blog, etc.) from these example places. For instance, user interface 400 may include the option to receive the name of the place, the city/locality of the place, as well as other data. FIG. 4 also shows an example of query process 10 identifying and merging multiple instances of a single place (e.g., Voltage Coffee) from multiple data providers into a canonical place record (e.g., within the above-noted data store). Posts from places that are known to exist in the real world may be more relevant to a user than posts from unknown sources. Additionally, the real world places may be more likely to want to engage a user and call him/her to action. Associating a real-world place with a post may enable query process 10 to augment the metadata mapped (e.g., attached) to the post with location data, the type of place (e.g. restaurant, nightclub, community organization, etc.), which may be used when determining relevance as will be discussed in greater detail below.

In some implementations, and continuing with the above-example one or more attributes for the information associated with the entity may be identified 302 by query process 10, and, in some implementations, the one or more attributes may include at least one of an entity category, an entity location, and an entity account geographic scope, as well as other attributes. For example, query process 10 may define a unique structured ontology that may include one or more attributes at least for the above-noted information that may include but is not limited to (1) Places (entities such as a business, an organization, a person, a local attraction/event, a band, a sports team, etc.) and/or each place's classification (e.g., "Restaurant" vs. "Shopping", "Women's Clothing &

Accessories" vs. "Men's Clothing & Accessories", etc.); (2) a mapping of each place to its official accounts across various social media networking sites such as Facebook and Twitter (e.g., Department Store X may have the official account @DepartmentStoreX on Twitter); (3) an algorithmically and/or editorially derived "account geographic scope" for each social media networking site account (e.g., "National," "Regional", "Local", etc.); and (4) a set of editorially defined and algorithmically derived attributes about each piece of content in posts on the one or more social media networking sites (e.g., does the post content include an image, video, link, is the post content a re-post of another post, etc.).

Figure 5A:
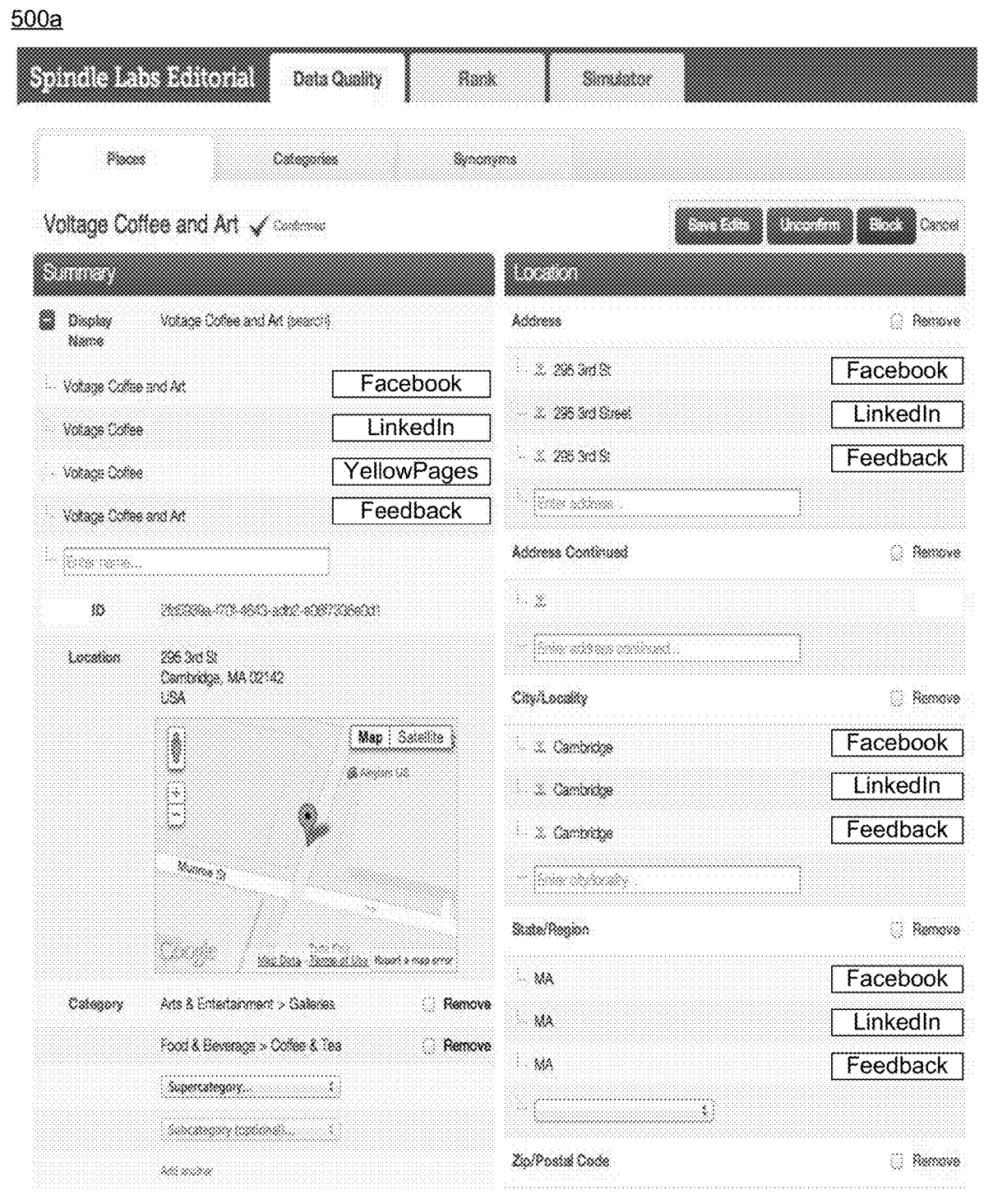
Figure 5B:
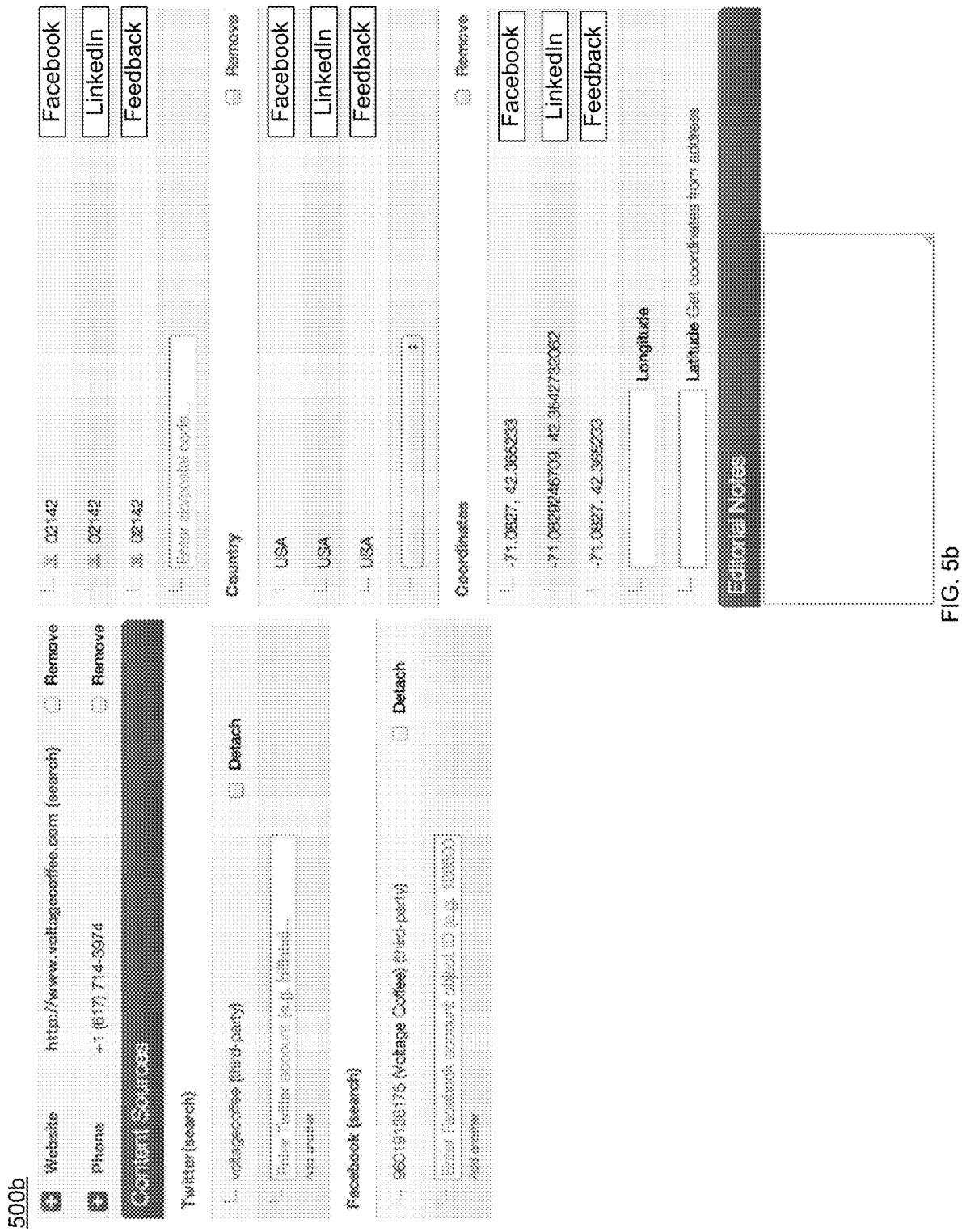
FIG. 5b is an illustrative diagrammatic view of a screen image displayed by the query process of FIG. 1 according to one or more implementations of the present disclosure.

Referring at least to FIGS. 5a and 5b, an example user interface associated with query process 10 is shown respectively at user interface 500a and 500b. User interfaces 500a and 500b may be combined into a single user interface. User interface 500a and 500b show a Place Details view associated with query process 10. For example, query process 10 may store each data provider's value for each example field shown (e.g., as well as for other example fields not shown). Query process 10 may select the best data from all available sources. In some implementations, an editor (e.g., via query process 10) may overwrite or augment the selection of query process 10 for any field. Examples of the place details may include place metadata, such as but not limited to, business category, street address and geographic coordinates, and any Twitter or Facebook accounts (or other social media site accounts) that query process 10 may have identified and joined with the place (e.g., Voltage Coffee). Moreover, query process 10 may join the example metadata with the content in, e.g., a searchable index. For instance, generally, when the Twitter account @voltagecoffee shares content, Twitter may only provide the account ID, timestamp, and the body of the content (e.g., Tweet). In some implementations, query process 10 may annotate that content with the example metadata. Typically, location centric discovery services may rely on geo coordinates assigned to each individual post; however, even if an actual post contains no geographical information (e.g., during and/or after being posted), query process 10 may still map that content by applying the above-noted location information metadata of the associated place. In some implementations, the social media site accounts may be identified by query process 10 both algorithmically (e.g., web searches and crawls directly against the social media site's API) and/or manually by editors (e.g., via query process 10). Query process 10 may collect and ingest the content from each source (e.g., from each social media site account source identified).

Using the above-noted defined structured ontology, query process 10 may fetch and index the appropriate content when an editor (e.g., via query process 10) may apply unique ranking strategies as will be discussed in greater detail below. In some implementations, query process 10 may have access to a system populated with a licensed datastore of entity (e.g., place) listings, such as those noted above, and/or populated with a user-generated list of places. As noted above, once populated with the place information, query process 10 may (e.g., automatically) discover and associate these places with their official social media networking site accounts. Query process 10 may accomplish this using one or more example techniques to find and associate the appropriate accounts with the appropriate entity. For example, query process 10 may (e.g., automatically) crawl any website known to be associated with each place (often provided by a licensed place datastore, and/or provided by user submission) and may check for hyperlinks to any specific Facebook, Twitter and/or other social media networking site accounts. In the example, if any accounts are found, query process 10 may associate the accounts with the places associated with those websites. In some implementations, query process 10 may (e.g., automatically) crawl Facebook, Twitter and/or other social media networking sites for accounts with attributes similar to the places in the datastore. Using Facebook as an example, query process 10 may utilize the Facebook APIs to query for places within the known area. For example, if the place information in the datastore includes a "pizza X" restaurant in "Palo Alto, Calif." query process 10 may query Facebook for any "pizza Xs" within a threshold area surrounding Palo Alto, Calif. In some implementations, direct matches found may be associated by query process 10 with their corresponding places in the datastore. Query process 10 may query Facebook, Twitter and/or other social media networking sites for places or entities (as noted above) in certain cities. For instance, using Palo Alto as an example, query process 10 may return all of the places that were not discovered via first querying for each unique place in that city. In some implementations, query process 10 may once again attempt to associate these newly discovered places with places in the datastore.

In some implementations, query process 10 may (e.g., automatically) evaluate things like the similarity of names between places, the proximity of locations as determined by their respective street addresses, etc. If any two places are deemed to be highly similar, the social media networking site account may be (e.g., automatically) associated with the place in the datastore. In some implementations, query process 10 may (after one or more of the above queries) still identify one or more discovered Facebook places that were not successfully matched with places in the datastore. In the example, query process 10 may (e.g., automatically) analyze those places to determine which are active (e.g., business owned accounts) as opposed to those places which are inactive (e.g., stub pages without an owner). Query process 10 may promote the active places and add them to the datastore.

In some implementations, query process 10 may (e.g., once the datastore is populated with the social media networking site accounts) ingest content from each respective social media networking site. For example, for every Facebook account discovered, query process 10 may (e.g., automatically) request its content from Facebook, as well as any content referencing that account by, e.g., name or ID. The same may apply to every other known social media networking site account.

In some implementations, query process 10 may categorize the places into the correct business category. Such a categorization may be using one or more techniques. For example, within the above-noted structured ontology, an editor (e.g., via query process 10) may map the categories of other services (e.g., social media networking sites) to a structured place category ontology in the datastore of query process 10. For example, an editor may denote that the Facebook place category "Restaurant" maps to the place category "Restaurant" in the datastore of query process 10. When query process 10 attempts to categorize its places, query process 10 may lookup the category of the Facebook accounts associated with the place, discover that the Facebook category is "Restaurant" and may associate the place with the place category "Restaurant" in the structured ontology in the datastore. Other techniques of categorization may also be used without departing from the scope of the disclosure.

As noted above, and referring at least to the example user interface 600 associated with query process 10 in FIG. 6, query process 10 may (e.g., automatically) classify known social media networking site account as having a particular geographic scope, e.g., national, regional or local. Query process 10 may accomplish this utilizing one or more techniques. For example, query process 10 may analyze known websites associated with the places in the datastore. In some implementations, a place website address may be used to determine account geographic scope by, e.g., sorting websites in descending order by the number of places with which they are associated; query process 10 may assume that accounts derived from the 500 most commonly place-associated websites are national accounts. In some implementations, query process 10 may attempt a more complicated technique of (e.g., automatically) marking social networking accounts as being national. For example, for each known account, query process 10 may geographically plot known associated places and derive the maximum distance between any two points. For example, consider the Twitter account @nationalcoffeechain. This Twitter account may be associated with places in Miami, Fla. and Seattle, Wash. By plotting these stores and evaluating the distance, query process 10 may determine that the @nationalcoffeechain Twitter account is national if the distance is greater than some threshold distance. In another example, there may only be a few places associated with an account and those places may all be associated in one small region. In the example, those accounts may be marked by query process 10 as being Regional. As another example, there may be other accounts where multiple places are associated with one another, but those places all fall within one small predefined area and/or there may be only one place associated with an account. In the example, the account may be classified as being Local.

In some implementations, an editor (e.g., via query process 10) may write rules that treat national, regional and local accounts differently. For example, for the person standing on the street corner looking for content from and/or about local businesses, an editor may believe that content from @nationalcoffeechain is uninteresting since, e.g., large national social media networking site accounts typically broadcast impersonal content that may not be directed at the customers within any particular geography. If this is not the case, an editor may want to treat national social media networking site accounts like @nationalcoffeechain differently than smaller, local accounts. For example, an editor (e.g., via query process 10) may write a rule that applies a negative weight to content from national accounts unless that content contains words like, e.g., "nationwide" or "your local store" or the like. In the example, if @nationalcoffeechain should send a post directing people to visit "your local store" "nationwide", the post may not receive the negative weight. Conversely, if the post lacks one or more of these phrases, the post may receive a negative weight. Similarly, an editor may want to feature small, independent coffee shops in a nearby feed (e.g., search feed, news feed, etc.). An example technique to accomplish this may be for an editor (e.g., via query process 10) to apply a positive weight to all content authored by places of type Coffee Shop with a social media networking site account of the geographic scope Local. However, other rules may be implemented to accomplish the same or similar results.

In some implementations, a plurality of posts from the one or more social media sites may be identified 306 by query process 10, wherein at least a portion of the plurality of posts may include at least a portion of the one or more attributes for the information associated with the entity. For example, query process 10 may analyze one or more identified 306 posts from one or more of the social media sites, e.g., to enrich its metadata in the above-noted index. For example, query process 10 may analyze the properties of a Facebook post identified 306 by query process 10 to determine whether the post includes an image attribute or standard text-only status update. As another example, query process 10 may analyze the properties of a Facebook post identified 306 by query process 10 to determine whether the post includes a URL attribute. In some implementations, query process 10 may scrape those URLs to determine whether they are from a popular image sharing service (e.g., Instagram) to infer that the Facebook post or Twitter post contains an image. As another example, query process 10 may analyze the text of the post for date and time mentions using, e.g., streaming natural language processing (NLP) and may add time relevance metadata to the post before storing it for lookup, e.g., in the above-noted datastore. For example, a post (or other document) mentioning "next Friday 3 pm-6 pm" could be annotated as relevant on the next Friday, from 3:00 PM EST to 6:00 PM EST.

In some implementations, as query process 10 ingests content, query process 10 may (e.g., automatically) analyze the content for the attributes defined by the editor (e.g., via query process 10). For example, the editor (e.g., via query process 10) may define that all Twitter content containing the phrase "RT" or marked as a "Retweet" via Twitter's post metadata should be tagged within the structured ontology as a "Retweet" (e.g., a repost of another user's content.) As another example, the editor (e.g., via query process 10) may define that any content containing "http://" should be tagged within the structured ontology as "has link." As another example, the editor (e.g., via query process 10) may define that any content with a URL pointing at a defined service (e.g., http://twitpic.com) should be tagged within the structured ontology as "has image." Thus, query process 10 may (e.g., automatically) identify the corresponding content and tag the corresponding content with the appropriate label within the structured ontology.

In some implementations, query process 10 may iteratively complete any of the above-noted processes. In some implementations, when at least one of the iterations have occurred, the editor (e.g., via query process 10) may generate a set of one or more ranking profiles (e.g., ranking strategies) for nearby places from (and about) which to create the feed of ranked social content.

Figure 7:
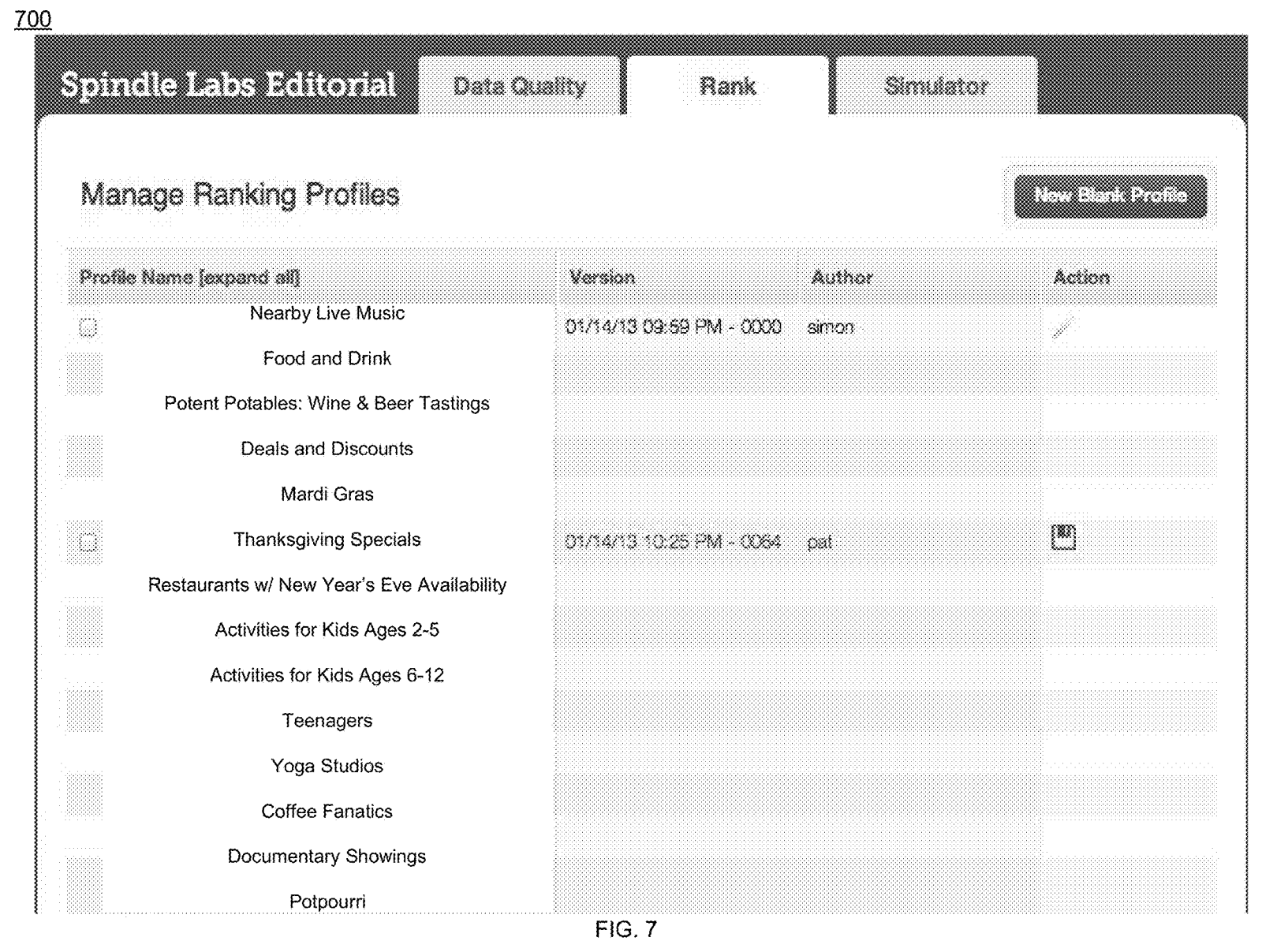

For instance, in some implementations, and referring at least to FIG. 7, a relevance profile associated with the one or more attributes may be generated 304 by query process 10. For example, FIG. 7 shows an example user interface (e.g., user interface 700) associated with query process 10 that may enable an editor to generate new relevance profiles or manage existing relevance profiles.

In some implementations, query process 10 may include an automated process (e.g., tracking user feedback to figure out to determine that users click on posts containing photos more often than they click on posts containing the phrase "sold out", and then using that to provide a positive weight to posts with photos and a negative weight for "sold out" posts) that may be used to generate 304 and/or revise relevance profiles. In some implementations, any users (e.g., end users) may also be enabled (e.g., via query process 10) to generate 304 relevance profiles.

Each relevance profile may include a collection of rules created by an editor (e.g., via query process 10). While three types of relevance rules may be described, it will be appreciated that other types of relevance rules may be used without departing from the scope of the disclosure. The relevance profile may include a content rule. For instance, the relevance rule may include a basic content rank as shown by example at user interface 800 associated with query process 10 shown in FIG. 8. In the example, the editor (e.g., via query process 10) may provide terms and/or phrases, select from any of the metadata made available by the ingested content and account processing/enrichment, and select time in effect. As will be discussed in greater detail below, query process 10 may apply a "positive weight" to post content from a local social media networking site account that contains the appropriate attributes, such as, e.g., an image and/or contains specific terms such as "dancing". As another example, an editor may decide that some phrases and attributes are interesting in all content, regardless of the category of place that authors the content. For instance, the phrase "on sale" or "event" may be interesting in all cases and a positive weight may be applied. The concept of weights will be discussed in greater detail below. Similarly, some phrases or attributes may always be uninteresting. For example, an editor may want to suppress content that contains either a Retweet or is Reply to another user. The editor may write a rule that applies a negative weight to any content (e.g., post content) that matches these attributes. Other example attributes (not shown) in user interface 800 may include, but are not limited to, whether the post includes the user's text query with text matching mode (e.g. phrase (the query "miami heat" matches "The Miami Heat won the championship last year"), all (the query "miami heat" matches "The heat is unbearable in Miami this time of year"), any (the query "miami heat" matches "The heat isn't working and the apartment is freezing"), etc.), whether the post mentions the current local date, how often unique local dates are mentioned in the post, whether the post is authored by a place within a predetermined distance from the user, whether the post mentions a place within a predetermined distance from the user, as well as the ability to enter a raw query syntax (e.g., Lucene query parser syntax, ElasticSearch Query Domain-Specific Language (DSL), etc.).

In some implementations, the content rule may include a category content rule. For instance, as shown by example at user interface 900 associated with query process 10 shown in FIG. 9, the same or similar options may be available as the above-noted basic content rank, but the editor (e.g., via query process 10) may also select one or more categories to which to apply the rule. For example, an editor may want to apply a positive weight to content from Yoga Studios that mention the phrase "free class." Loose text matching may be utilized by query process 10 to find posts that may closely but may not exactly match the phrase specified. Other example attributes (not shown) in user interface 800 may include, but are not limited to, whether the post includes the user's text query with text matching mode, whether the post mentions the current local date, how often unique local dates are mentioned in the post, whether the post is authored by a place within a predetermined distance from the user, whether the post mentions a place within a predetermined distance from the user, as well as the ability to enter a raw query syntax (e.g., Lucene query parser syntax, ElasticSearch Query DSL, etc.).

In some implementations, the relevance profile may include weights to be applied to content based on the category of the place that authored the content. For instance, the relevance profile may include place category-based rules as shown by example at user interface 1000 associated with query process 10 shown in FIG. 10. For creating a place category-based rule, in the example, an editor may choose a category and a time in effect (discussed in greater detail below). For instance, the rule may enable a positive weight to be applied to, e.g., Coffee Shops, but specifically between 8-10 am. It will be appreciated that other category and time in effect selections may be used without departing from the scope of the disclosure. Other example attributes (not shown) in user interface 800 may include, but are not limited to, whether the post includes the user's text query with text matching mode, whether the post mentions the current local date, how often unique local dates are mentioned in the post, whether the post is authored by a place within a predetermined distance from the user, whether the post mentions a place within a predetermined distance from the user, as well as the ability to enter a raw query syntax (e.g., Lucene query parser syntax, ElasticSearch Query DSL, etc.).

In some implementations, as noted above, the relevance profile may specify a "time in effect" for relevance rules. For example, and referring at least to example user interface 1100 associated with query process 10 shown in FIG. 11, in addition to setting global positive and negative weights on different categories of places (and/or other attributes), an editor (e.g., via query process 10) may impose these rules during different times of day as noted above. For example, the editor (e.g., via query process 10) may choose to positively weight places of type "Restaurant>Breakfast & Brunch" between the hours of 6 am and 10 am. Conversely, the editor (e.g., via query process 10) may choose to apply a negative weight to places of type "Shopping>Clothing & Fashion" after 8 pm (e.g., when most clothing stores close). As a result of these rules, any content shared by these businesses (and/or shared by someone else about these businesses) during the designated time may receive a corresponding positive or negative weight. Time ranges may be expressed according to the user's local time zone or a global, universal time. Time in effect may also include recurrence rules, e.g., every Tuesday, first and third Friday of the month, every $25^{th}$ of December, etc.

In some implementations, the relevance profile may include a time of day reference. For example, an editor (e.g., via query process 10) may want to apply positive and negative weights to time references in the post content, e.g., during certain periods of the day. For example, an editor may want to apply a positive weight to the phrase "2 pm" at 2 pm (or some threshold amount of time before and/or after 2 pm) since, e.g., it may be immediately relevant. An editor may also want to apply a negative weight to the phrase "noon" at 2 pm (or some threshold amount of time before and/or after "noon") since, e.g., it may be no longer immediately relevant. These example time references may also exist across themes and may be applied to categories (as well as any other attributes). For example, the phrase "breakfast" may be an implied reference to a particular time of day. Thus, an editor may want to positively weight post references to "breakfast" during the morning hours (e.g., 6 am-10 am). Similarly, at night hours (e.g., 5 pm-2 am), the editor may want to positively weight post content from restaurants to help a customer find a place to eat dinner. In the example, "breakfast" may be no longer an interesting term. Thus, at night, the editor may apply a negative weight to any content from places of the type Restaurant (or from someone about places of the type Restaurant) that includes the phrase "breakfast".

As discussed throughout, and still referring at least to example user interface 1100 associated with query process 10 shown in FIG. 11, the relevance profile may include at least one of a positive weight, negative weight, "require,"

and "forbid" associated with at least one of the one or more attributes. For example, once an editor has created a rule, the editor (e.g., via query process 10) may apply a positive weight. For instance, the application of a weight may include characteristics, such as but not limited to: require, forbid, multiplicative score factor (e.g., 0.1 to 1.9), or non-linear scoring function based on yet other content attributes, user context, or global values. For example, if the editor requires that a rule be in effect, then content may satisfy that rule to appear in the results. For example, if an editor wanted to create a photos only set of results, the editor (e.g., via query process 10) may require a rule that identified photos. Conversely, an editor may purge all photos from a set of results by "Forbidding" the same rule that identified photos. By assigning a value from 0.1 to 1.9, an editor may apply a score that may be applied to any content (e.g., post content) that satisfies that particular rule. Query process 10 may enable variable weights to be defined based on any function, such as a weight with an inverse relationship to the distance from the user to the place that authored the post, or an inverse relationship to the time remaining until the start time of an event described in a post, as well as other functions.

As another example, an editor may believe that photos are particularly interesting when shared by Restaurants. Thus, the editor (e.g., via query process 10) may apply a positive weight to places of the type Restaurant. As such, any post content shared by a restaurant (and/or shared by someone else about a restaurant) that contains an image may receive the corresponding positive weight. The editor may also decide that links are particular interesting when shared by non-profit organizations. Thus, the editor (e.g., via query process 10) may apply a positive weight to places of the type Non-profit Organization. As such, any post content shared by a non-profit organization (and/or shared by someone else about a non-profile organization) that contains a URL may receive the appropriate positive weight. The same is true when an editor believes that a particular phrase or attribute from a certain category of place is uninteresting. For example, an editor (e.g., via query process 10) may define that the phrase "order online" is uninteresting to a local shopper when shared by a place of the type Shopping>Clothing & Fashion. Thus, the editor (e.g., via query process 10) may apply a negative weight to content shared by places of the type Shopping>Clothing & Fashion (and/or shared by someone else about Shopping>Clothing & Fashion) when that content includes the phrase "order online". An editor may also require (or forbid) that post content from a certain category of place contains a set of phrases and/or attributes for it to appear in a ranked list of nearby content. For example, an editor may believe that content from places of the type Companies is interesting only if it contains phrases like, e.g., "event" and/or "workshop", and post content from places of type Real Estate Agent is only interesting if it contains phrases like, e.g., "open house". An editor (e.g., via query process 10) may write these rules and thus content may only appear from places of these types if it includes the required phrases and/or attributes. It will be appreciated that terms and phrases may also be examples of attributes. In some implementations, an editor may also combine the notion of category content rules and time of day in effect (as well as any combination of other rules, including any combination of weights in the rules). For example, places of type Coffee Shop may be less interesting in the afternoon than they are in the morning. Thus, the editor (e.g., via query process 10) may apply a negative weight to places of type coffee shop after 12 pm. As another example, assume that coffee shops may offer promotions or host events in the afternoon. To account for this, the editor (e.g., via query process 10) may apply a negative weight to content from Coffee Shops after 12 pm only if that content doesn't contain the phrase "afternoon".

As another example, an editor (e.g., via query process 10) may apply a positive or negative weight to each category (or sub-category) of Place. For example, in an effort to produce what the editor believes may be the most interesting ranked nearby feed, an editor (e.g., via query process 10) may choose to apply a negative weight to all places of the type "Automotive Services". As a result, any content (e.g., post content) authored by a social media networking site account owned by these places (and/or authored by someone else about these places) may receive the corresponding negative weight. Similarly, the editor may believe that places of type "Restaurant" are interesting and they may apply a positive weight accordingly. As such, any content authored by social media networking site accounts owned by these type of places (e.g., restaurants or other food related places such as sandwich shops) (and/or authored by someone else about these places) may receive the corresponding positive weight.

As another example, post content from an individual user about a particular entity may be labeled as a "place reference" in the above-noted structured ontology. Similarly as discussed above, an editor (e.g., via query process 10) may write ranking strategies to suppress or promote this content given its content, attributes, the type of business it is in reference to, the time of day, etc. For example, an editor (e.g., via query process 10) may choose to apply a negative weight to all "place reference" content from someone other than the place itself as it may be generally less interesting than content authored by the place. As another example, it may be possible that non-place authored "place reference" content is actually highly interesting and the attributes that determine this may be, e.g., place category and time of day specific. For example, an editor (e.g., via query process 10) may choose to apply a positive weight to "place reference" content about places of type Nightlife only when the content includes the phrase "long line". As such, if ever an individual user references the "long line" at a nightclub in post content, the post content may receive the corresponding weight.

In some implementations, at least the portion of the plurality of posts may be ordered 308 on a display by query process 10 based upon, at least in part, the relevance profile associated with the one or more attributes. For instance, using the above-noted ranking strategies, an ordered 308 (e.g., ranked) list of social content (e.g., posts) from and/or about nearby places (or other attributes) may be provided to an end user, e.g., via a display of any of the above-noted client electronic devices. For example, the above-noted relevance rules and their weights may determine the sort order of search results (e.g., from a query issued and/or received from a user via query process 10). For instance, for content gathered in the datastore or otherwise identified by query process 10, the weights (if any) of all applicable relevance rules may be multiplied to determine a cumulative algorithmic score. In some implementations, the content with the highest score may be considered most interesting and may appear first. In some implementations, the relevance profile may include a list of the above-noted attributes with associated weights (as will be discussed in greater detail below).

The ordered 308 list of ranked social content from and/or about, e.g., nearby places, may be provided to an end user in many different ways. For example, query process 10 may provide to the end user a client application (e.g., a downloadable application, a non-downloaded web application, a traditional website application, or a set of application programming interfaces to enable any application built in-house or by a 3$^{rd}$ party). However, other techniques may also be used without departing from the scope of the disclosure.

Referring to the downloadable application example for illustrative purposes only, the application (e.g., via query process 10) may return query results to a user, e.g., by determining their current time and/or location. In some implementations, this determination may occur when a user opens the mobile application on their client electronic device (e.g., mobile device) using known techniques and may pass this information to query process 10 along with or separately from a request for content (e.g., a search). Given the user's current time and location, query process 10 may apply the appropriate set of the above-noted editorial ranking strategies to the content authored by and/or about businesses near the user. For example, if the user's request is sent at 2 pm, query process 10 may apply each rule in effect at 2 pm (or some threshold time before/after 2 pm). These rules may include, but are not limited to, the above-noted positive and negative weights on the categories of nearby places, the national vs. regional scopes of accounts associated with nearby places, the positive and negative weights on the phrases and attributes of content shared by and/or about nearby places, etc. In some implementations, query process 10 may run the positive and weights through a search engine capability of query process 10 (or a separate search engine), calculate a score (e.g., for each post content), and return a list of results to the requesting user (e.g., via the appropriate client electronic device) of the user.

Figure 12A:
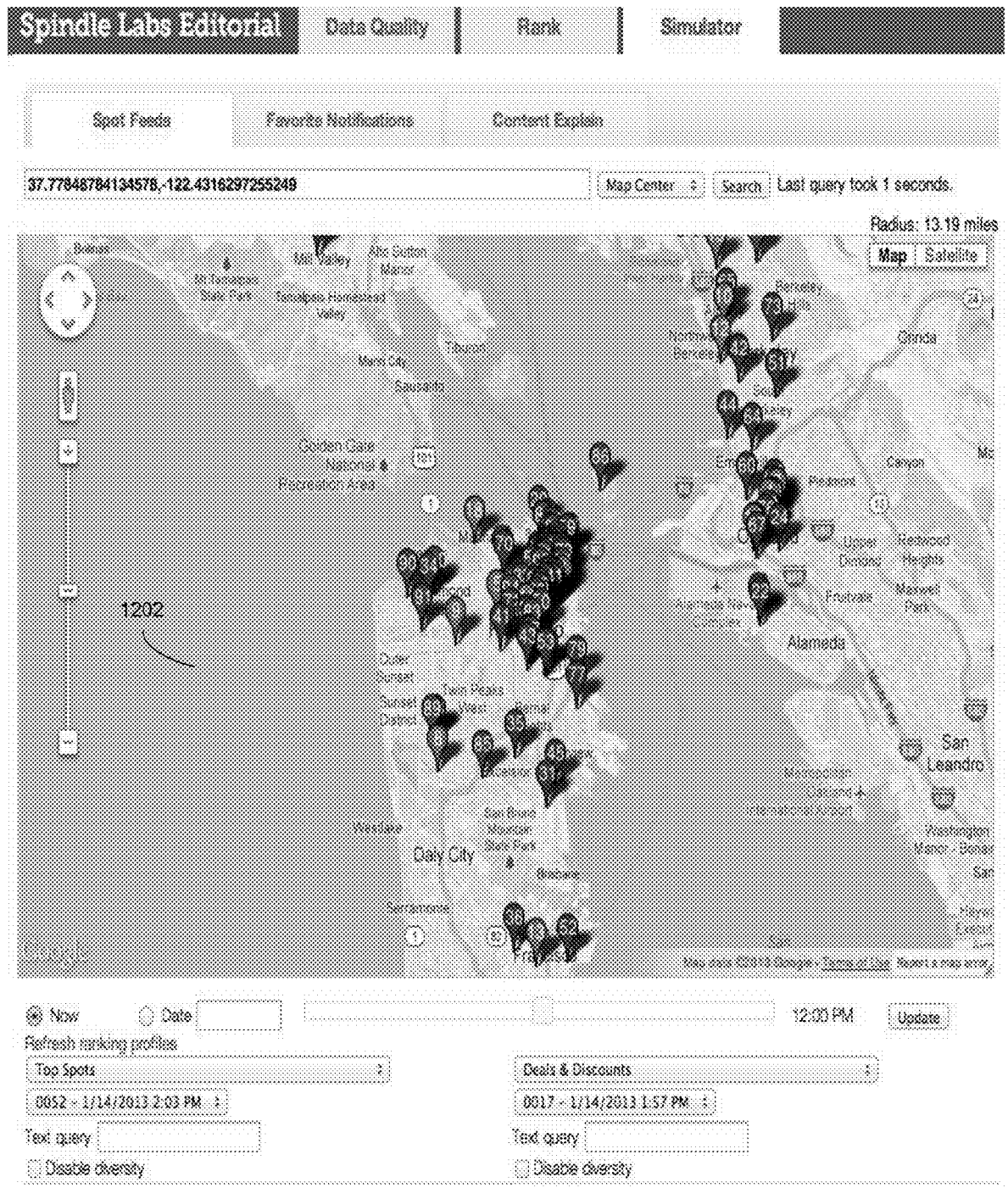
FIG. 12a is an illustrative diagrammatic view of a screen image displayed by the query process of FIG. 1 according to one or more implementations of the present disclosure.
Figure 12B:
FIG. 12b is an illustrative diagrammatic view of a screen image displayed by the query process of FIG. 1 according to one or more implementations of the present disclosure.

In some implementations, query process 10 may (e.g., via the client application) enable the user to view a list of nearby businesses, which may be annotated with its most highly ranked content, which may include the content authored by the business and/or the content authored by another user about the business (e.g., as ordered 308 by query process 10). The order of the businesses may be determined by the combined score applied to the content as a result of the application of the above-noted ranking strategies. Referring at least to FIG. 12*a* and FIG. 12*b*, an example view is shown of returned results of what a user may view at any particular time and place via user interface 1200*a* and user interface 1200*b* (respectively) associated with query process 10. User interfaces 1200*a* and 1200*b* may be combined into a single user interface. In some implementations, query process 10 may adjust the user's location by, e.g., selecting a different area on a map (e.g., map 1202), adjusting the date and time of the query, selecting different profiles to compare and/or different versions of the same profile, as well as other adjustments.

In the example, the above-noted score (e.g., for individual places) and/or the associated posts, such as score 1204) may be shown in the results, in addition to the matched rules of the query (e.g., matched rule 1206), as well as the rules that did not match (e.g., non-matched rule 1208). In the example, the score may demonstrate how the above-noted weights may have influenced the final rank. Similarly, in the example, the matched (or non-matched) rules may demonstrate which rules were applied to the content to view how and why the score is generated. In some implementations, such information may be hidden from the end user, such that the end user may simply see the ordered 308 best content.

In some implementations, given the significant complexity of such queries, query process 10 may constantly (e.g., periodically) pre-compute each query. For example, query process 10 may frequently pre-compute a result set for people near, e.g., location X, location Y, and/or any place (e.g., Voltage Coffee). Thus, when a user accesses the application near at least one of these locations, query process 10 may choose to either compute the query in real-time for that unique user and/or may choose to access a cached and pre-computed version of the result set previously determined (e.g., from another user's query and/or an automated pre-computation). This may enable query process 10 to return results faster to the end user.

In some implementations, query process 10 may push relevant alerts directly to users on their respective client electronic device. For example, posts from places designated by the user (e.g., via query process 10) as "Favorites" may be delivered to the user when the post exceeds a relevance or score threshold as defined in a relevance profile. In some implementations, query process 10 may enable a user to set up keyword searches that may be constantly monitored by query process 10. For instance, when posts are found by query process 10 to exceed a relevance threshold as defined by a relevance profile, the posts may be pushed to the user's client electronic device (e.g., via text message, email, notification flag, etc.). In some implementations, the frequency (e.g., the times of day and rate at which alerts may be delivered to the users may be managed by a set of flexible, editor or user defined alert delivery rules. For instance, the alert may be sent immediately when the relevance threshold has been reached, may be sent when a threshold number of relevance thresholds have been reached, or at a predetermined times of the day. Other alert delivery rules may also be used without departing from the scope of the disclosure.

In some implementations, social factors (e.g., total number of "Likes", total number of "Likes" by friends, comments by friends, reposts or "retweets" by a user's followees, etc.) may be included as a different type of rule in the above-noted relevance profiles. In some implementations, a personalized result set may be returned for each user, even if two users enter the same query from the same location and time. For example, to personalize the ranking of social media networking site content from and/or about nearby local places, an editor (e.g., via query process 10) may define one or more additional attributes within the above-noted structured ontology. For instance, and using Facebook for example purposes only, at a high level, the editor (e.g., via query process 10) may establish a mapping between, e.g., Facebook Graph ID attributes and the corresponding place category within the above-noted structured ontology. An editor may also define positive and negative weights (as discussed above) around these additional attributes.

In some implementations, and continuing with using Facebook for example purposes only, Facebook users may indicate their activities and interests via Facebook user interfaces. For instance, Facebook user may indicate that they like the activity Skiing. They may also indicate that they like the interest Wine. In either case, each of these activities and interests may be given a corresponding object ID. For example, the interest Wine may have the Graph ID 20410752104. In the above-noted structured ontology of query process 10, an editor (e.g., via query process 10) may indicate that the Graph ID 20410752104 may be associated with all places of the type Wine Bar. Furthermore, the Graph ID may also be associated with the phrase "wine." With the Graph ID successfully mapped to the above-noted structured ontology, an editor (e.g., via query process 10) may apply a positive or negative weight for each Graph ID that the user has liked on Facebook. For example, an editor may define that all liked Graph IDs should receive a positive weight of 1.2.

In the example, when a user accesses via query process 10 and has authenticated with Facebook (and/or other social media networking site), query process 10 may access the user's list of liked Facebook Graph IDs and apply the weight as determined by the appropriate rules. In the example, query process 10 may request a generic list of ranked social content from and/or about nearby places. Further in the example, query process 10 may apply any personalization weights on that result set. In some implementations, query process 10 may pass the personalization weights directly to the above-noted index to compute a different raw result set entirely. For instance, assume the user has indicated they like Wine on Facebook. The user may see content from (or about) places of the type Wine Bar (or similar place type) more highly ranked than someone that does not like Wine on Facebook. Additionally, if a place of a different type mentions the phrase "Wine", the content may also receive the positive weight. For example, if an art gallery invites people to "come enjoy a glass of wine" (e.g., via a post), this content may appear more highly ranked to the person who has indicated they like Wine on Facebook than to the person who has not made such an indication.

While the disclosure may include examples of returning results from social media networking sites, it will be appreciated that results may be returned from other sources as well. For example, sources may include but are not limited to internet search engines and email accounts. As such, the description of returning results from social media networking sites should be taken as an example only and not to otherwise limit the scope of the disclosure.

While the disclosure may include examples of returning documents (e.g., posts) from social media networking sites, it will be appreciated that other document types may be searched and returned as well. For example, documents may include but are not limited to, email, text messages, website content, and scanned documents (e.g., PDFs). As such, the description of returning posts from social media networking sites should be taken as an example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   with a computing device, providing a list of a plurality of entities;
   with the computing device, defining a structured ontology, wherein the structured ontology includes (i) the plurality of entities and a corresponding classification for each entity (ii) a mapping of each entity to one or more corresponding social media accounts on one or more social media sites, (iii) an account scope for each social media account, and (iv) a set of attributes applicable to content from the one or more social media sites, and associated with the plurality of entities;
   receiving, from a client computing device and at the computing device, one or more weight input commands that assign at least one weight to at least one attribute that categorizes content associated with the plurality of entities, wherein the content associated with the plurality of entities is obtained from the one or more social media sites;
   receiving, at the computing device and from the client computing device based on user input, one or more time in effect commands indicating a time period for when the at least one weight is assigned to the at least one attribute, and wherein the at least one weight includes at least one of a positive weight or a negative weight;
   generating by the computing device a relevance profile for at least one entity of the plurality of entities, the relevance profile including the at least one weight assigned to the at least one attribute and the time period, wherein the relevance profile further including a content rule idicating that the at least one weight is assigned to one or more particular terms associated with the content;
   searching the one or more social media sites, using one or more queries, for the content associated with the at least one enity of the plurality of entities;
   receiving, by the computing device, the content associated with the at least one entity and obtained from the one or more social media sites;
   indexing, by the computing device, the content associated with the at least one entity;
   receiving, at the computing device and at a particular time, a request to rank the content associated with the at least one entity based on the set of attributes of the defined structured ontology;
   determining at the computing device that the particular time, when the request to rank the content is received, falls within the time period;
   ranking, by the computing device and in response to determining that the particular time falls within the time period, the content associated with the at least one entity based upon a matching of the content to at least one attribute of the set of attributes and utilizing the at least one weight; and transmitting a ranking of the content associated with the at least one entity to the client computing device, wherein the ranked content is displayed in a user interface at the client computing device.

2. The computer-implemented method of claim 1 wherein the at least one weight further includes at least one of a require that requires that a first particular term be included with particular content, and a forbid that requires that the first particular term be excluded from the particular content.

3. The computer-implemented method of claim 1 wherein the at least one attribute include at least one of an entity category, an entity location, and an entity account geographic scope.

4. The computer-implemented method of claim 1 wherein the relevance profile includes a place category-based rank rule that indicates that the at least one weight is assigned to a selected category of entities.

5. The computer-implemented method of claim 1 wherein the relevance profile includes a time of day reference rule indicating that the at least one weight is assigned to a time reference associated with the content.

6. A computing system comprising:
a processor and a memory, the processor configured to:
define a structured ontology, wherein the structured ontology includes (i) a plurality of entities and a corresponding classification for each entity (ii) a mapping of each entity to one or more corresponding social media accounts on one or more social media sites, (iii) an account scope for each social media account, and (iv) a set of attributes applicable to content from the one or more social media sites, and associated with the plurality of entities;
receive, from a client computing device, one or more weight input commands that assign at least one weight to at least one attribute that categorizes content associated with the plurality of entities, wherein the content associated with the plurality of entities is obtained from the one or more social media sites;
receive, from the client computing device and based on user input, one or more time in effect commands indicating a time period for when the at least one weight is assigned to the at least one attribute, wherein the at least one weight includes at least one of a positive weight or a negative weight;
generate a relevance profile for at least one entity of the plurality of entities, the relevance profile including the at least one weight assigned to the at least attribute and the time period, wherein the relevance profile further including a content rule indicating that the at least one weight is assigned to one or more particular terms associated with the content;
search the one or more social media sites, using one or more queries, for the content associated with the at least one entity;
receive the content associated with the at least one entity and obtained from the one or more social media sites;
indexing the content associated with at least one entity:
receive, at a particular time, a request to rank the content associated with the at least one entity based on the set of attributes of the defined structured ontology;

determine that the particular time, when the request to rank the content is received, falls within the time period; and rank, in response to determining that the particular time falls within the time period, the content associated with the at least one entity based upon a matching of the content to at least one attribute of the set of attributes and utilizing the least one weight, wherein the ranked content is configured to be displayed in a user interface at the client computing device.

7. The computing system of claim 6 wherein the at least one weight further includes at least one of a require that requires that a first particular term be included with the particular content, and a forbid that requires that the first particular term be excluded from the particular content.

8. The computing system of claim 6 wherein the at least one attribute include at least one of an entity category, an entity location, and an entity account geographic scope.

9. The computing system of claim 6 wherein the relevance profile includes a place category-based rank rule that indicates that the at least one weight is assigned to a selected category of entities.

10. The computing system of claim 6 wherein the relevance profile includes a time of day reference rule indicating that the at least one weight is assigned to a time reference associated with the content.

11. A computer program product residing on a non-transitory computer readable storage medium having a plurality of instructions stored thereon which, when executed by a processor, cause the processor to perform operations comprising:
defining a structured ontology, wherein the structured ontology includes (i) a plurality of entities and a corresponding classification for each entity (ii) a mapping of each entity to one or more corresponding social media accounts on one or more social media sites, (iii) an account scope for each social media account, and (iv) a set of attributes applicable to content from the one or more social media sites, and associated with the plurality of entities;
receiving, from a client computing device, one or more input weight commands that assign at least one weight to at least one attribute that categorizes content associated with the plurality of entities, wherein the content is obtained from the one or more social media sites;
receiving, at a computing device and from the client computing device based on user input, one or more time in effect commands indicating a time period for when the at least one weight is assigned to the at least one attribute, wherein the at least one weight includes at least one of a positive weight or a negative weight;
generating a relevance profile for an entity of the plurality of entities, the relevance profile including the at least one weight assigned to the at least one attribute and the time period, wherein the relevance profile further includes a content rule indicating that the at least one weight is assigned to one or more particular terms associated with the content;
searching the one or more social media sites, using one or more search queries, for the content associated with the entity;
receiving the content associated with the entity and obtained from the one or more social media sites;
indexing the content associated with the entity;
receiving, at a particular time, a request to rank the content associated with the entity based on the set of attributes of the defined structured ontology;

determining that the particular time, when the request to rank the content is received, falls within the time period; and ranking, in response to determining that the particular time falls within the time period, the content associated with the entity based upon a matching of the content to at least one attribute of the set of attributes and utilizing the at least one weight, wherein the ranked content is configured to be displayed in a user interface at the client computing device.

12. The computer program product of claim 11 wherein the at least one weight further includes at least one of a require that requires that a first particular term be included with particular content and a forbid that requires that the first particular term be excluded from the particular content.

13. The computer program product of claim 11 wherein the at least one attribute include at least one of an entity category, an entity location, and an account geographic scope.

14. The computer program product of claim 11 wherein the relevance profile includes a place category-based rank rule that indicates that the at least one weight is assigned to a selected category of entities.

15. The computer program product of claim 11 wherein the relevance profile includes a time of day reference rule indicating that the at least one weight is assigned to a time reference associated with the content.

\* \* \* \* \*